(12) United States Patent
Miyamoto et al.

(10) Patent No.: US 9,016,688 B2
(45) Date of Patent: Apr. 28, 2015

(54) IMAGE FORMING APPARATUS, METHOD FOR CONTROLLING IMAGE FORMING APPARATUS, AND STORAGE MEDIUM WITH DECIDING UNIT FOR ORIENTATION OF IMAGE TO BE PRINTED

(71) Applicant: Canon Kabushiki Kaisha, Tokyo (JP)

(72) Inventors: Daijiro Miyamoto, Kawasaki (JP); Makiya Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/871,866

(22) Filed: Apr. 26, 2013

(65) Prior Publication Data

US 2013/0292898 A1 Nov. 7, 2013

(30) Foreign Application Priority Data

May 7, 2012 (JP) .................................. 2012-106313

(51) Int. Cl.
| | | |
|---|---|---|
| *B65H 7/02* | (2006.01) | |
| *B65H 9/20* | (2006.01) | |
| *H04N 1/00* | (2006.01) | |
| *H04N 1/12* | (2006.01) | |
| *H04N 1/193* | (2006.01) | |

(52) U.S. Cl.
CPC .............. *B65H 9/20* (2013.01); *H04N 1/00578* (2013.01); *H04N 1/0058* (2013.01); *H04N 1/00596* (2013.01); *H04N 1/0062* (2013.01); *H04N 1/00721* (2013.01); *H04N 1/00737* (2013.01); *H04N 1/00758* (2013.01); *H04N 1/00761* (2013.01); *H04N 1/00774* (2013.01); *H04N 1/12* (2013.01); *H04N 1/193* (2013.01); *H04N 2201/0446* (2013.01); *H04N 2201/0094* (2013.01); *H04N 2201/0082* (2013.01)

(58) Field of Classification Search
USPC ......... 271/265.01, 186; 399/45, 401, 411, 15, 399/16, 17; 400/76; 358/1.2, 1.18, 449, 358/451, 462, 474, 498, 505
See application file for complete search history.

(56) References Cited

U.S. PATENT DOCUMENTS

| | | | | |
|---|---|---|---|---|
| 6,785,488 | B2 * | 8/2004 | Katsuyama | ..................... 399/16 |
| 6,804,478 | B2 * | 10/2004 | Martin et al. | ................... 399/45 |
| 6,862,103 | B1 | 3/2005 | Miura et al. | |
| 7,056,048 | B2 * | 6/2006 | Braun et al. | .................. 400/630 |
| 7,102,764 | B1 * | 9/2006 | Hulan | ............................ 358/1.2 |
| 7,126,704 | B2 | 10/2006 | Miura et al. | |
| 7,446,896 | B2 * | 11/2008 | Barrios | ........................ 358/1.18 |
| 7,633,640 | B2 | 12/2009 | Miura et al. | |

(Continued)

FOREIGN PATENT DOCUMENTS

JP 2002-226084 A 8/2002

*Primary Examiner* — Gerald McClain
(74) *Attorney, Agent, or Firm* — Fitzpatrick, Cella, Harper & Scinto

(57) ABSTRACT

A system comprises a conveying unit configured to convey an original, a reading unit configured to read the original that is being conveyed by the conveying unit, a printing unit configured to print an image on a paper based on an image of the original read by the reading unit, a determination unit configured to determine an orientation of the original according to the image obtained by reading the original with the reading unit, and a deciding unit configured to decide an orientation of an image that is to be printed on the original, according to the orientation of the original determined by the determination unit, wherein the printing unit prints the image on the original, in the orientation of the image decided by the deciding unit.

8 Claims, 13 Drawing Sheets

(56) References Cited

U.S. PATENT DOCUMENTS 8,928,951 B2 * 1/2015 Utsunomiya ................. 358/461
2013/0293934 A1 * 11/2013 Shinto ........................... 358/498
2014/0320940 A1 * 10/2014 Ino et al. ....................... 358/498
2014/0321897 A1 * 10/2014 Ogata et al. ................... 399/373

* cited by examiner

FIG. 14

| SET ITEM | SET VALUE |
|---|---|
| PAPER SIZE | POSTCARD |
| PAPER ORIENTATION | PORTRAIT |
| PRINTING METHOD | DUPLEX |
| BINDING DIRECTION | LONG-EDGE BINDING |
| PAPER ORIENTATION DETERMINATION | ON |
| DETERMINATION METHOD | POSTCARD |

FIG. 15

| DETERMINATION OBJECT | DETERMINATION METHOD |
|---|---|
| JAPANESE POSTCARD | ARE THERE SEVEN RECTANGLES ARRANGED SIDE BY SIDE IN THE UPPER RIGHT OF PAPER? |
| INVOICE | IS THERE CHARACTER STRING "INVOICE" IN THE UPPER CENTER OF PAPER? |
| FORM 1 | IS THE IMAGE SIMILAR TO FORM 1 IMAGE? |

IMAGE FORMING APPARATUS, METHOD FOR CONTROLLING IMAGE FORMING APPARATUS, AND STORAGE MEDIUM WITH DECIDING UNIT FOR ORIENTATION OF IMAGE TO BE PRINTED

BACKGROUND OF THE INVENTION

1. Field of the Invention

The present invention relates to an image forming apparatus, a method for controlling an image forming apparatus, and a storage medium.

2. Description of the Related Art

Recently, image forming apparatuses provided with hardware resources such as a scanner and a printer are installed at offices, homes, and the like, and processing such as copying, printing, facsimile transmission, and the like is performed on a daily basis. Such image forming apparatuses can perform printing on various sheets, and, for example, may perform printing on paper such as a postcard having front and back surfaces or upper and lower orientations. If a user feeds a postcard in a wrong orientation at the time of printing, the printed paper becomes upside down or its front and back are reversed with respect to the intended content.

Japanese Patent Laid-Open No. 2002-226084 discloses a technique in which a mark detection sensor for detecting the front and back of a postcard is disposed in a paper feed tray of a printing apparatus or on a conveying path from the paper feed tray to an image forming unit. Furthermore, it is described that the printing apparatus uses the mark detection sensor to detect the front and back or upper and lower orientations of a postcard, and performs printing after reversing as necessary the front and back surfaces or upper and lower orientations of an image that is to be printed on the paper according to the detection result.

However, according to the above-described conventional technique, a dedicated mark detection sensor has to be provided in order to determine the orientation of a paper for printing.

SUMMARY OF THE INVENTION

The present invention enables realization of a system that determines the orientation of an image of an original read by a reading unit configured to read an image of an original, and prints an image in the same orientation as the determined orientation of the image.

One aspect of the present invention provides an image forming apparatus, comprising: a conveying unit configured to convey an original; a reading unit configured to read the original that is being conveyed by the conveying unit; a printing unit configured to print a print image on a paper based on a read image of the original read by the reading unit; a determination unit configured to determine an orientation of the original according to the read image obtained by reading the original with the reading unit; and a deciding unit configured to decide an orientation of the print image that is to be printed on the original, according to the orientation of the original determined by the determination unit; wherein the printing unit prints the print image on the original, in the orientation of the print image decided by the deciding unit.

Further features of the present invention will be apparent from the following description of exemplary embodiments with reference to the attached drawings.

BRIEF DESCRIPTION OF THE DRAWINGS

FIG. 14 is a table showing an example of print setting information of a print command according to this embodiment.

FIG. 15 is a table showing an example of a list of values and determination methods set as a paper orientation determination method according to this embodiment.

DESCRIPTION OF THE EMBODIMENTS

Figure 1:
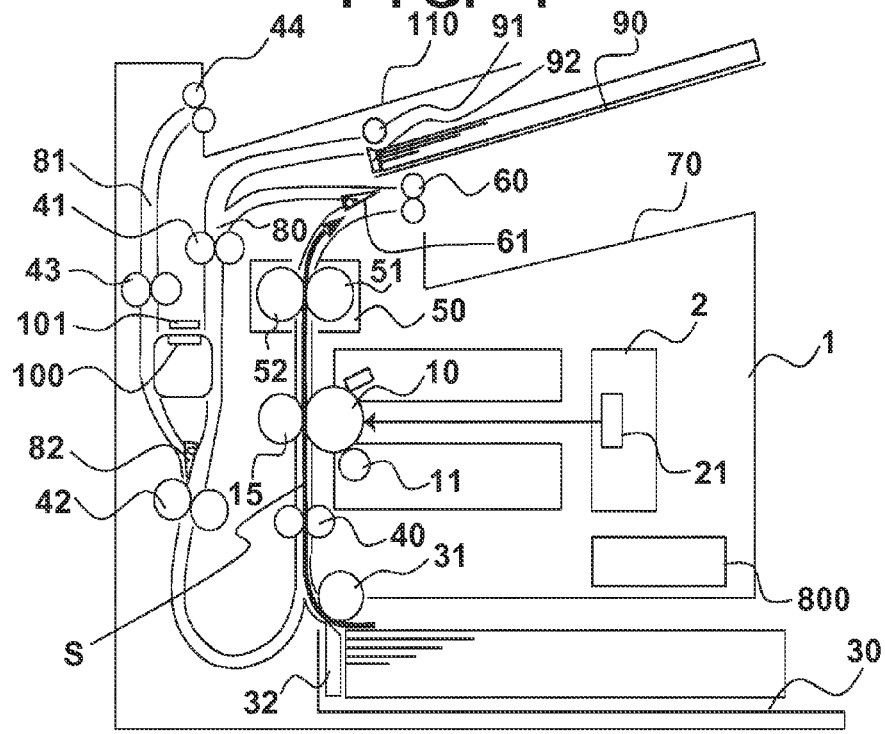
FIG. 1 is a schematic view of an MFP according to an embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Printing Apparatus

Hereinafter, reading processing and printing processing of an image using a printing apparatus (image forming apparatus) will be described with reference to FIGS. 1 to 9. In this example, operations will be described in which both surfaces of an original G fed from a second paper feeding unit 90 are read and the images read from the original G are formed on both surfaces of a sheet S fed from a first paper feeding unit 30. First, an example of the configuration of a printing apparatus will be described with reference to FIG. 1. At the center of a printing apparatus 1, a rotatable photosensitive drum 10 that functions as an image carrier and a development roller 11 that is disposed adjacent to the photosensitive drum 10 and rotates while carrying toner are arranged. Upon receiving a print signal, a light-emitting unit 21 included in an optical unit 2 emits laser light toward the surface of the photosensitive drum 10 that is rotating. A latent image is formed by electric charge on the surface of the photosensitive drum 10 toward which the laser light has been emitted. The development roller 11 rotates and supplies toner carried thereby to the latent image on the surface of the photosensitive drum 10. Accordingly, a toner image is formed on the surface of the photosensitive drum 10.

Meanwhile, the sheets S accommodated in the first paper feeding unit 30 are conveyed sheet by sheet by a CST pickup roller 31 and a separating unit 32 toward conveying rollers 40. The conveying rollers 40 convey the sheet S to a transfer unit 15 so as to match the timing of the toner image on the surface of the photosensitive drum 10 and the leading edge of the sheet S. In this example, the sheet refers to a medium on which the printing apparatus 1 can print an image, and examples thereof include media made of various materials, such as paper, OHP sheet, and the like.

The toner image that has been conveyed to the transfer unit 15 by the rotation of the photosensitive drum 10 is transferred to the sheet S with application of bias and pressure to the transfer unit 15. Furthermore, the transfer unit 15 conveys the sheet S to a fixing unit 50. In the fixing unit 50, heat from a rotatable heat roller 51 and pressure from a rotatable pressure roller 52 that opposes the heat roller 51 cause the toner image to be fixed onto the sheet S. The sheet S onto which the toner image has been fixed is conveyed to paper discharge rollers 60. In the case of simplex printing, the paper discharge rollers 60 convey the sheet S out of the apparatus without any further processing, and the sheet S is stacked in a first paper discharge unit 70 (first discharge unit). Furthermore, constituent components of the printing apparatus 1 are controlled by an electrical component 800, which will be described later with reference to FIG. 8. Note that a conveying path on which a sheet fed from the first paper feeding unit 30 is printed and is discharged to the first paper discharge unit 70 is referred to as a first conveying path.

Figure 2:
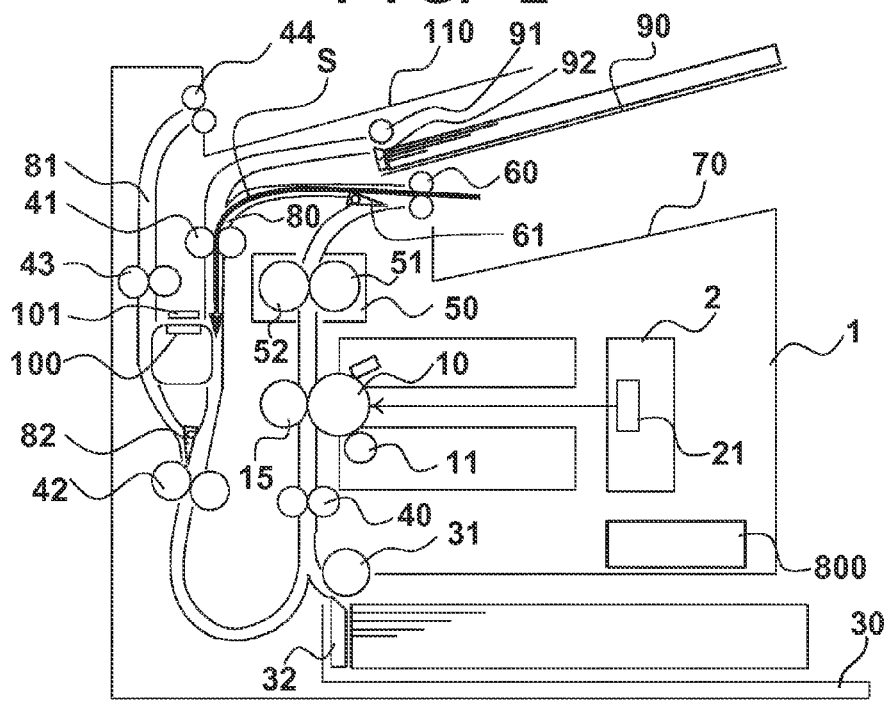
FIG. 2 is an explanatory view of duplex printing processing according to this embodiment.
Figure 3:
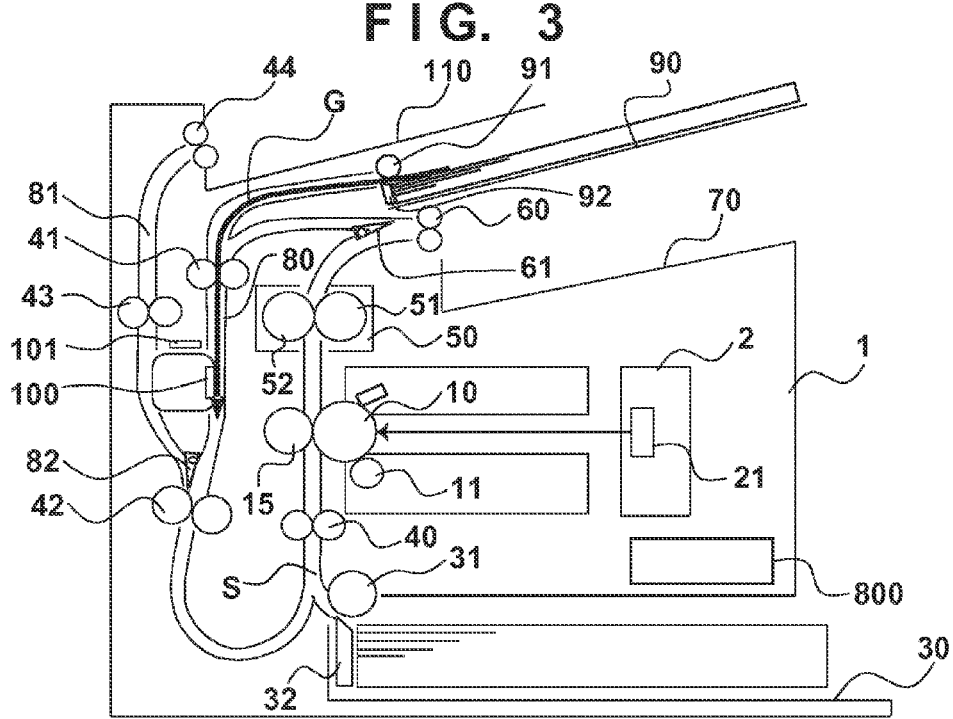
FIG. 3 is an explanatory view at the time of start of reading the front surface of an original according to this embodiment.

Next, duplex printing processing will be described with reference to FIG. 2. After passage of the trailing edge of the sheet S, a duplex flapper 61 switches the conveying path. Subsequently, the paper discharge rollers 60 rotate in reverse, and convey the sheet S to a duplex conveying path (second conveying path) 80. The sheet S that has been switched back is conveyed via conveying rollers 41 to an image reading unit 100. As shown in FIG. 2, the image reading unit 100 is disposed near the duplex conveying path 80. Subsequently, the sheet S is conveyed to conveying rollers 42 and 40, and again to the transfer unit 15 in which a toner image is transferred to the back surface of the sheet S (a surface that is different from the transfer surface described with reference to FIG. 1), and, after fixing, the sheet is stacked in the first paper discharge unit 70.

Next, processing that reads the information of an original and performs duplex printing on a sheet will be described with reference to FIGS. 3 to 7. The originals G accommodated in the second paper feeding unit 90 are conveyed sheet by sheet by a CIS pickup roller 91 and a separating unit 92 toward the conveying rollers 41. Meanwhile, the image reading unit 100 emits light toward a white reference member 101 and performs white reference value correction, and then rotates to a position at which it faces the duplex conveying path 80 (the position shown in FIG. 3), before start of reading a first surface, which is the front surface of the original G fed from the second paper feeding unit 90. That is to say, the image reading unit 100 rotates to a position at which it reads an image of the original G that is being conveyed on the duplex conveying path 80. The conveying rollers 41 convey the original G to the image reading unit 100. The image reading unit 100 has been already put on standby at a position at which it faces the duplex conveying path 80, and information read by the image reading unit 100 is stored as information on the first surface of the original in an image memory 804, which will be described later with reference to FIG. 8. Note that the white reference member 101 is arranged downward in consideration of attachment of dust.

Figure 4:
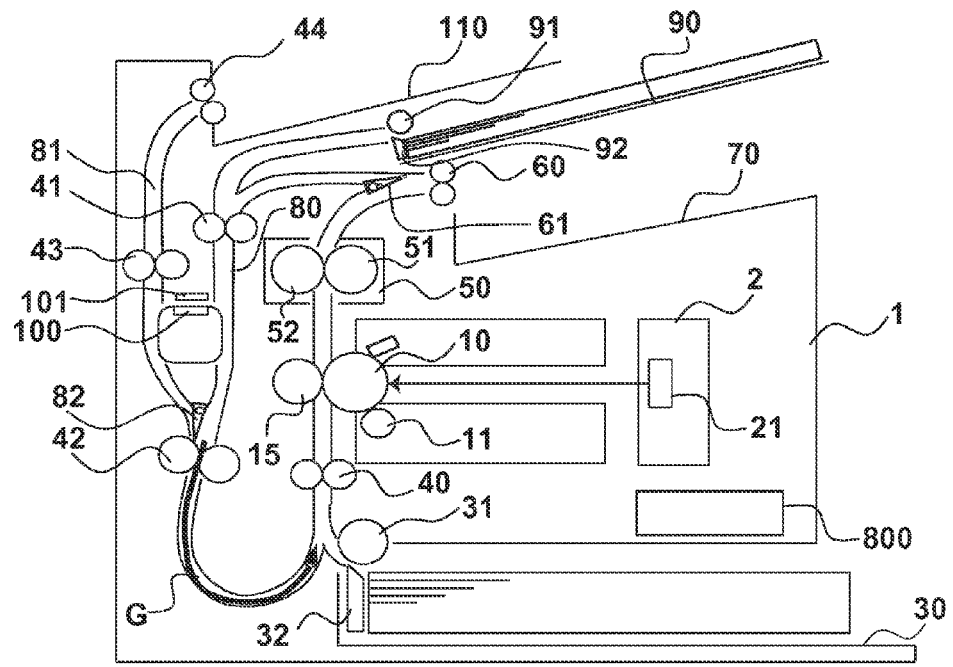
FIG. 4 is an explanatory view at the time of end of reading a first surface, which is the front surface of an original, according to this embodiment.

Next, an operation performed at the time of end of reading a first surface, which is the front surface of the original, will be described with reference to FIG. 4. The original G that has passed by the image reading unit 100 is conveyed to the conveying rollers 42. The conveying rollers 42 stop when the trailing edge of the original G has passed by a switch-back flapper 82. At that time, the original G has stopped in a state where it is held between the conveying rollers 42. After the elapse of a predetermined time, the conveying rollers 42 rotate in reverse, and convey the original G to an original-dedicated conveying path (third conveying path) 81. At that time, the original G may be conveyed to the conveying rollers 40 without being stopped at the conveying rollers 42, so as to be subjected to the image formation process described with reference to FIG. 1 after the reading process on the first surface.

Figure 5:
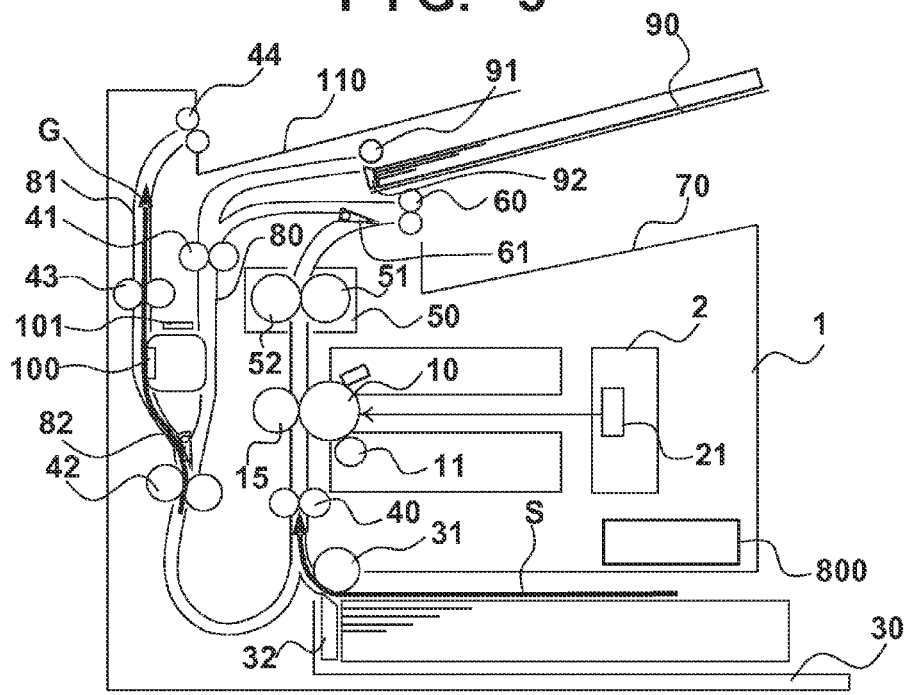
FIG. 5 is an explanatory view at the time of start of reading a second surface, which is the back surface of an original, according to this embodiment.

Next, an operation performed at the time of start of reading a second surface, which is the back surface of the first surface, will be described with reference to FIG. 5. At the same time as the switch-back flapper 82 switches the conveying path from the duplex conveying path 80 to the original conveying path 81, the image reading unit 100 rotates to a position at which it faces the original conveying path 81. That is to say, the image reading unit 100 rotates to a position at which it reads an image of the sheet that is being conveyed on the original conveying path 81. When the conveying rollers 42 rotate in reverse, the original G is conveyed along the original conveying path 81 to the image reading unit 100. When the original G is conveyed to and passes by the image reading unit 100, information on a second surface, which is the back surface of the original, is read and stored in the image memory 804 as information on the second surface of the original. In this manner, the image reading unit 100 is disposed between the duplex conveying path 80 and the original conveying path 81, and can move so as to read images of a sheet conveyed on both the conveying paths.

When the reading of the second surface of the original G starts, the sheets S fed from the first paper feeding unit 30 are conveyed sheet by sheet to the conveying rollers 40. At substantially the same time, based on an image read from the second surface, which is the back surface of the original, stored in the image memory 804, a latent image of this image information is formed by the light-emitting unit 21 on the photosensitive drum 10. Next, a toner image formed based on the latent image is transferred by the transfer unit 15 to the sheet S, after which the sheet is conveyed to the fixing unit 50, and, thus, image formation of the second surface of the original is completed. Note that, in FIG. 5, feeding of the sheet S is started when reading of information on the second surface, which is the back surface of the original, is started, but the sheet S may be conveyed after information on the second surface has been read.

Figure 6:
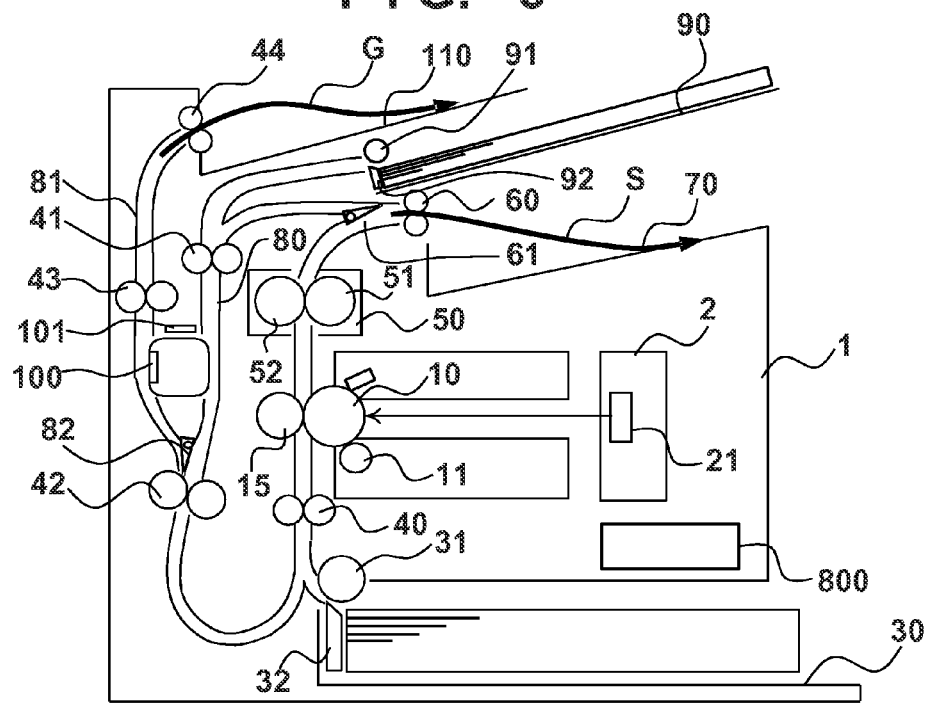
FIG. 6 is an explanatory view at the time of end of reading the back surface of an original according to this embodiment.

Next, an operation performed at the time of end of reading the back surface of the original will be described with reference to FIG. 6. The original G from which an image has been read is conveyed to conveying rollers 43 and 44, and is stacked in a second paper discharge unit (second discharge unit) 110. The switch-back flapper 82 detects that the trailing edge of the original G has passed thereby, using a sensor (not shown) that is provided upstream of the switch-back flapper in the conveying direction. Subsequently, the conveying path is switched from the original conveying path 81 to the duplex conveying path 80 such that the sheet S that has been subjected to duplex printing is conveyed toward the conveying rollers 40. The sheet S, on which formation of the image read from the second surface of the original G is completed, is conveyed by the reverse rotation of the paper discharge rollers 60 toward the duplex conveying path 80 to which the conveying path has been switched by the duplex flapper 61, in order to perform image formation on the back surface.

Figure 7:
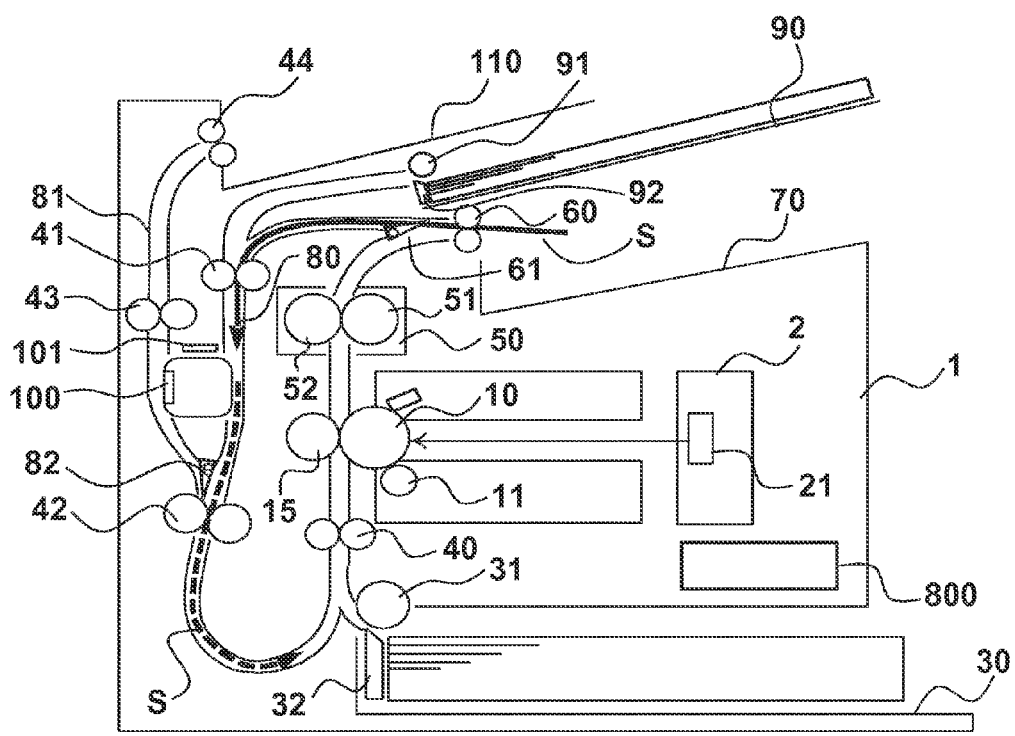
FIG. 7 is a view illustrating a state in which image formation on a sheet S is completed according to this embodiment.

Next, an operation performed at the time of image formation on the sheet S based on the image read from the first surface of the original will be described with reference to FIG. 7. The sheet S that has been conveyed to the duplex conveying path 80 passes by the image reading unit 100 facing the other side and is conveyed via the conveying rollers 42 to the conveying rollers 40, that is, conveyed again to the transfer unit 15 as the sheet S indicated by the broken line. On the sheet S, the image formation of the second surface of the original has ended, and an image of the first surface of the original is formed based on image information on the first surface of the original stored in the image memory 804. Specifically, the toner image is transferred and fixed onto the sheet S by the image forming unit configured by the optical unit 2, the photosensitive drum 10, the development roller 11, the transfer unit 15, and the fixing unit 50, after which the sheet is discharged and stacked in the first paper discharge unit 70.

As described above, in the printing apparatus 1 according to this embodiment, part of the conveying path for the original G and part of the conveying path for the sheet S are configured as a common path. Specifically, the conveying path for reading the first surface of the original G and the conveying path for performing duplex printing on the sheet S are configured as a common path. Accordingly, the apparatus can be made smaller.

Configuration of the Control Unit of the Printer

Figure 8:
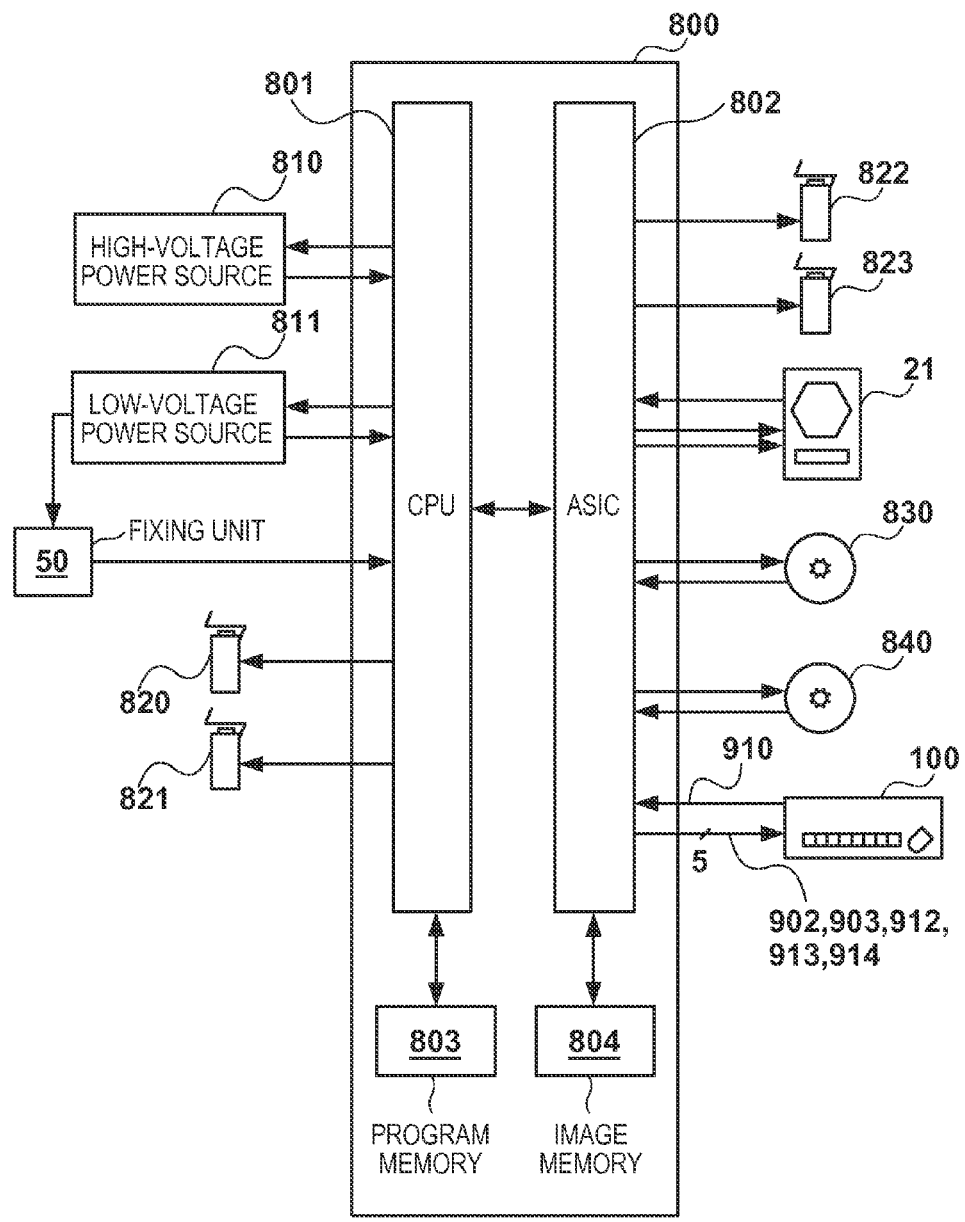
FIG. 8 is a diagram illustrating an operation of a control CPU according to this embodiment.

Next, an operation of a control CPU 801 and an ASIC 802 of a printer 207 (described later) in image formation of this embodiment will be described with reference to FIG. 8. FIG. 8 shows the configuration of units that are controlled by the control CPU 801. As shown in FIG. 8, the control CPU 801 is connected via the ASIC 802 to the light-emitting unit 21 including a polygon mirror, a motor, a laser light-emitting element, and the like. In order to form a desired latent image by performing scanning with laser light on the photosensitive drum 10, the control CPU 801 outputs a control signal to the ASIC 802 and controls the optical unit 2. In a similar manner, in order to convey the sheet S, the control CPU 801 controls a main motor 830 for driving the CST pickup roller 31, the conveying rollers 40, the photosensitive drum 10, the transfer unit 15, the heat roller 51, and the pressure roller 52. Furthermore, the control CPU 801 controls a CST paper feed solenoid 822 that is turned on when starting to drive the paper feed rollers for feeding the sheet S, and that drives the CST pickup roller 31. Moreover, the control CPU 801 controls, for example, a duplex drive motor 840 for driving the CIS pickup roller 91 and the conveying rollers 41 to 44.

Moreover, the control CPU 801 controls a high-voltage power source 810, the fixing unit 50, and a low-voltage power source 811 for controlling primary charging, development, primary transfer, and secondary transfer bias necessary for electrophotographic processing. Moreover, the control CPU 801 monitors the temperature using a thermistor (not shown) disposed at the fixing unit 50, and performs control such that the fixing temperature is kept constant. Furthermore, the control CPU 801 is connected via a bus or the like (not shown) to a program memory 803. The program memory 803 stores programs and data for executing part or the whole of the above-described control operations and processes performed by the control CPU 801 in the embodiments described in this specification. That is to say, the control CPU 801 performs the operations of the embodiments of the present invention using the programs and data stored in the program memory 803.

Based on the instruction from the control CPU 801, the ASIC 802 controls the velocity of a motor inside the light-emitting unit 21, the main motor 830, and the duplex drive motor 840. The motor velocity is controlled by detecting a TAC signal (a pulse signal that is output from a motor each time the motor rotates) from the motor, and outputting an acceleration or deceleration signal to the motor such that intervals between the detected TAC signals match a predetermined interval. If the control circuit is configured by a hardware circuit of the ASIC 802 in this manner, the control load of the control CPU 801 can be reduced.

Upon receiving a print command instructed from a client PC, the control CPU 801 drives the main motor 830, the duplex drive motor 840, and the CST paper feed solenoid 822, thereby conveying the sheet S. The toner image formed on the surface of the photosensitive drum 10 is transferred by the transfer unit 15 to the sheet S and is fixed onto the sheet by the fixing unit 50, after which the sheet is discharged by the paper discharge rollers 60 to the first paper discharge unit 70 that functions as a sheet stacking unit. In order to improve the alignment of sheets on which images have been formed, the first paper discharge unit 70 is provided with a gentle upward slope from a point near the paper discharge opening in the sheet discharge direction. In this example, the control CPU 801 supplies predetermined electrical power via the low-voltage power source 811 to the fixing unit 50, and, thus, a desired amount of heat is generated and applied to the sheet S so that the toner image on the sheet S is fused and fixed thereonto.

Next, an operation that reads an original will be described. Upon receiving a scan command instructed from a client PC, the control CPU 801 drives a duplex flapper solenoid 820 and the duplex drive motor 840. Moreover, the control CPU 801 operates a CIS paper feed solenoid, thereby transmitting the torque of the duplex drive motor 840 to the CIS pickup roller 91 and conveying the original G. The image reading unit 100 is connected to the ASIC 802 with various control signals CISLED, CISSTART, SYSCLK, Sl_in, Sl_select, and Sl_out, which will be described later. The control CPU 801 stores images read by the image reading unit 100 through various types of control via the ASIC 802, in the image memory 804 that is connected to the ASIC 802. Subsequently, the control CPU 801 moves the switch-back flapper 82 toward the original-dedicated conveying path by operating a switch-back solenoid 821, and rotates the duplex drive motor 840 in reverse, thereby conveying the original G to the second paper discharge unit 110.

Image Reading Unit

Figure 9:
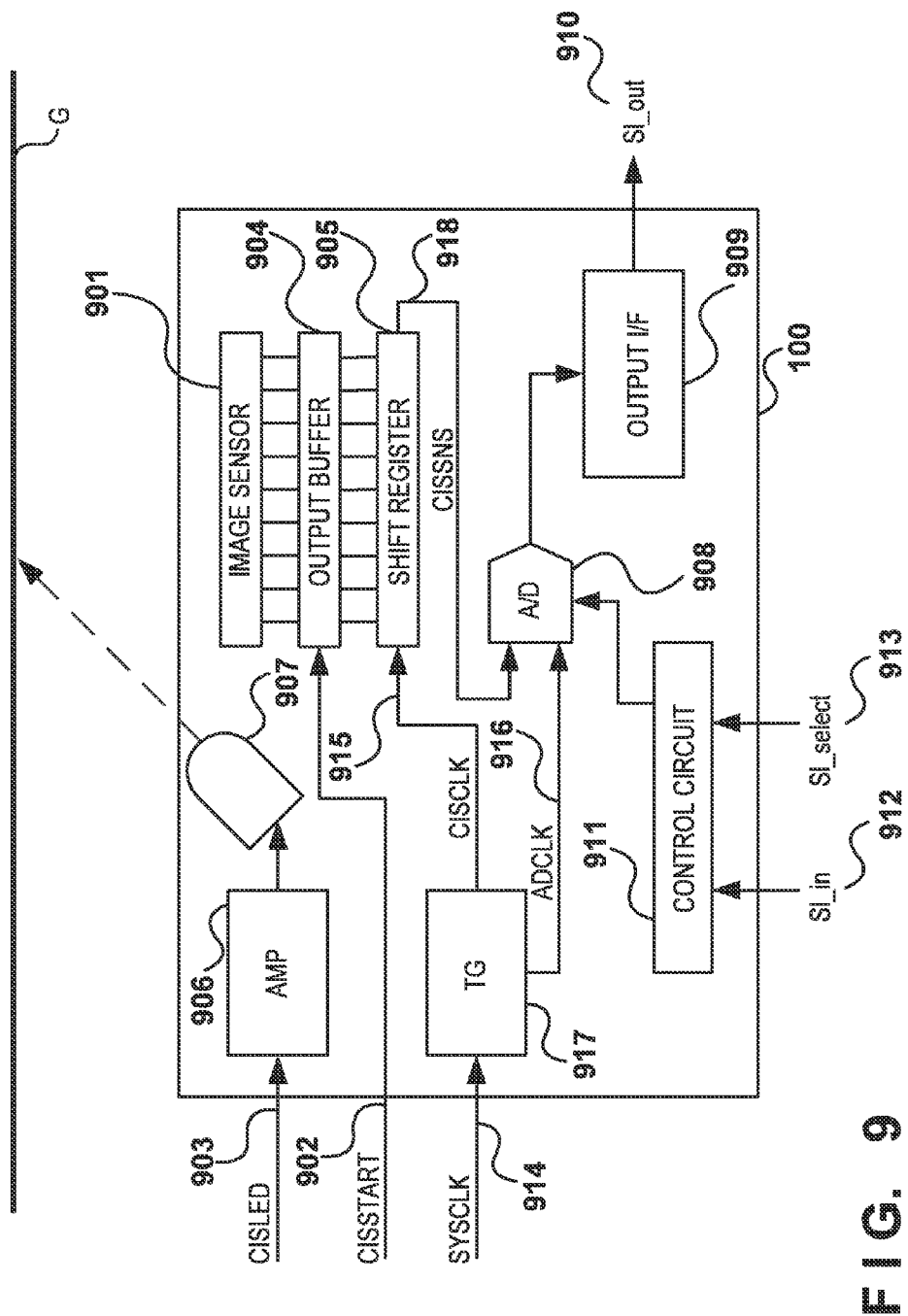
FIG. 9 is a diagram illustrating the configuration of an image reading unit according to this embodiment.

Next, the image reading unit 100 will be described in detail with reference to FIG. 9. FIG. 9 shows the circuit block of a CIS sensor (contact image sensor). Reference numeral 901 denotes a contact image sensor portion in which, for example, photodiodes corresponding to 10368 pixels are arranged in an array at a given main-scanning density (e.g. 1200 dpi). Reference numerals 902 and 915 respectively denote a start pulse CISSTART signal and a transfer clock CISCLK that are given to the CIS sensor. Reference numeral 914 denotes a system clock SYSCLK that decides the operation speed of the CIS sensor. Reference numeral 908 denotes an A/D converter. Reference numeral 916 denotes a CIS sampling clock ADCLK that decides a sampling speed of the A/D converter 908. Reference numeral 917 denotes a timing generator. Reference numeral 904 denotes an output buffer. Reference numeral 905 denotes a shift register. Reference numeral 903 denotes a light-emitting element control signal CISLED. Reference numeral 906 denotes a current amplifying unit. Reference numeral 907 denotes a light-emitting element that emits light uniformly onto the original G.

Next, an operation of the image reading unit will be described. When the CISSTART signal 902 is activated, the CIS sensor unit 901 starts accumulation of electric charge based on received light, and sequentially sets data in the output buffer 904. Next, when the transfer clock CISCLK 915 (e.g., approximately 500 kHz to 1 MHz) is given, the data set in the output buffer 904 is transferred as a CISSNS signal 918 by the shift register 905 to the A/D converter 908. Since the CISSNS signal 918 includes a predetermined data assurance area, the sampling has to be performed after the elapse of a predetermined time after the transfer clock CISCLK 915 rises. Furthermore, the CISSNS signal 918 is output in synchronization with both rising and falling edges of the transfer clock CISCLK 915. Accordingly, the frequency of the CIS sampling clock ADCLK 916 is set so as to be twice the frequency of the transfer clock CISCLK 915, and the CISSNS signal 918 is sampled at a rising edge of the CIS sampling clock ADCLK 916.

The timing generator 917 divides the system clock SYSCLK 914 into the CIS sampling clock ADCLK 916 and the transfer clock CISCLK 915. The phase of the CIS sampling clock ADCLK 916 is delayed by an amount corresponding to the data assurance area with respect to the transfer clock CISCLK 915.

The CISSNS signal 918 that has been converted by the A/D converter 908 into a digital signal is output as serial data to an Sl_out signal 910 at a predetermined timing under the control of an output interface circuit 909. At that time, an analog output reference voltage is output to a predetermined number of pixels from the start pulse CISSTART 902 in the CISSNS signal 918, and these pixels cannot be used as effective pixels. Meanwhile, a control circuit 911 can perform control such that the A/D conversion gain of the A/D converter 908 is changed according to an Sl_in signal 912 and an Sl_select signal 913. For example, if a sufficient contrast of a read image cannot be obtained, the control CPU 801 increases the contrast by increasing the A/D conversion gain of the A/D converter 908, so that images can be read always at a best contrast.

In this example, a system has been described in which all pixels are output as the CISSNS signal 918, which is a single output signal, but, in order to realize high-speed reading, the pixels may be divided into a plurality of areas, and A/D conversion may be performed simultaneously in these areas. Furthermore, the description above has been given using a CIS sensor as the image reading unit 100, but the present invention is not limited to this, and a CMOS sensor, a CCD sensor, and the like may be applied.

Configuration of the Printing System

Figure 10:
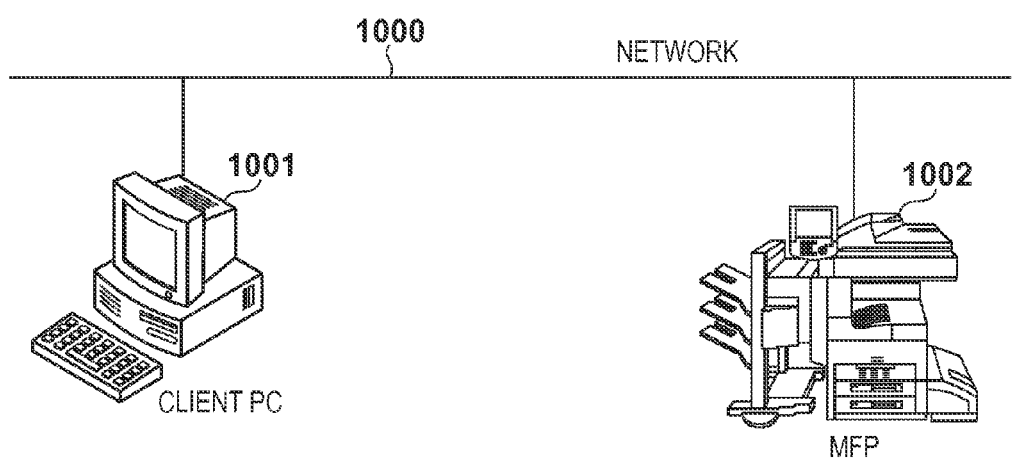
FIG. 10 is a view showing an example of the configuration of a document processing system according to this embodiment.

Next, the configuration of a document processing system according to this embodiment will be described with reference to FIG. 10. The document processing system is configured by, for example, a client PC 1001 and a multi function digital peripheral (MFP: multi function peripheral) 1002, which is a type of printing apparatus (image forming apparatus). Note that the present invention is not limited to this system configuration. For example, the present invention can be applied also to printing systems including other apparatuses, a plurality of client PCs, or a plurality of MFPs. The MFP 1002 is an apparatus having a copier function, a printer function, a facsimile function, and the like, and its configuration will be described later in detail. The apparatuses shown in FIG. 10 are communicably connected to each other via a network 1000 such as Ethernet (registered trademark). The client PC 1001 has various applications installed thereon, and can give a print instruction, for example, via a printer driver to the MFP 1002.

The MFP 1002 corresponds to the printing apparatus 1 described with reference to FIGS. 1 to 9. The MFP 1002 according to this embodiment reduces useless printing processing, using the configuration of the printing apparatus 1 described with reference to FIGS. 1 to 9, in particular, the configuration that enables printing processing and scanning processing to be performed on a sheet or an original fed from the first paper feeding unit 30 or the second paper feeding unit 90. Specifically, if a sheet to be printed has an orientation and the user sets the sheet in a wrong orientation on a paper feed cassette or a manual feed tray (the first paper feeding unit 30 or the second paper feeding unit 90), or the like, the configuration prevents an image from being printed upside down on the sheet and the sheet from being uselessly printed and output.

Hardware Configuration of the Printing Apparatus

Figure 11:
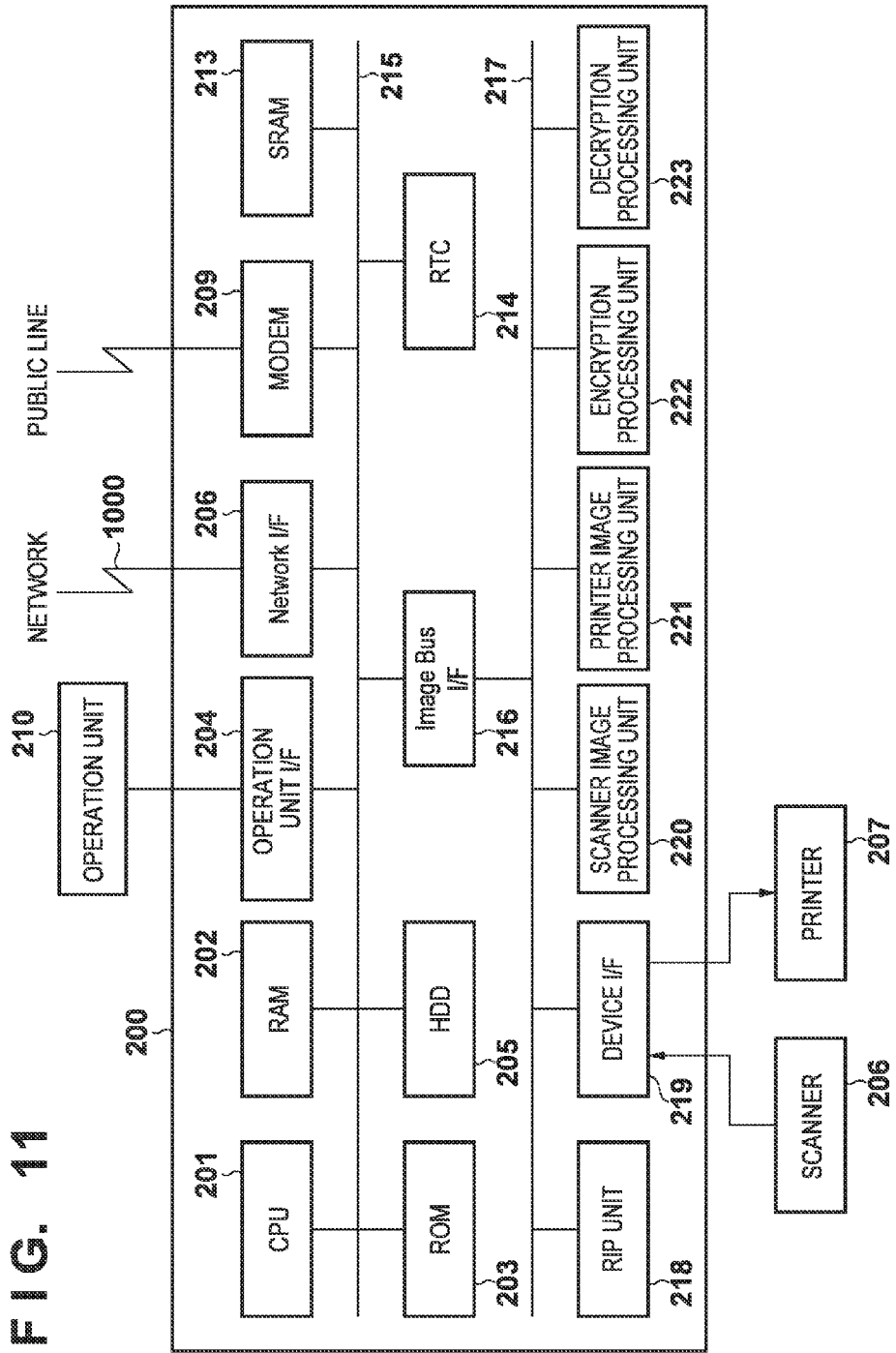
FIG. 11 is a diagram showing an example of the hardware configuration of the MFP according to this embodiment.

Next, an exemplary hardware configuration for controlling the software of the MFP 1002 (the printing apparatus 1) will be described with reference to FIG. 11. A control unit 200 is connected to a scanner 208 having the image reading unit 100 that reads an image and the printer 207 that prints an image on a sheet using the transfer unit 15 and the photosensitive drum 10. Furthermore, the control unit 200 is connected to the network 1000 and a public line through which the control unit inputs and outputs image information or device information.

The CPU 201 is a processor that comprehensively controls the entire MFP 1002. For example, the CPU 201 controls image processing of image data that is to be printed, and networks, and further controls printing processing by giving a print instruction to the CPU 801 of the printer 207. A RAM 202 is a system work memory for allowing the CPU 201 to operate, and is an image memory for temporarily storing image data. Furthermore, the MFP 1002 can communicate via a network interface 206 with the client PC 1001 according to an instruction from the CPU 201. For example, the MFP 1002 receives print data from the client PC 1001.

The RAM 202 functions as a main memory or a work area for the CPU 201. The RAM 202 stores setting information in the MFP, a job log and an operation log during processing, and the like. A ROM 203 is a boot ROM that stores a system boot program. An HDD 205 is a hard disk drive that stores system software, applications, and image data. Furthermore, the HDD 205 stores programs for executing the flowcharts in FIGS. 16 and 17, which will be described later. Note that the steps in these flowcharts are executed by the CPU 201. However, the steps in the flowcharts may be executed by a processor other than the CPU 201 or may be executed by the CPU 201 and another processor in cooperation with each other.

An operation unit interface 204 is an interface that controls display on a display screen, key input from a touch panel attached on a display screen, key input from hardware keys, or the like, and outputs, to an operation unit 210, image data that is to be displayed on the operation unit 210. Furthermore, this interface transmits information input by the user of this system from the operation unit 210 to the CPU 201. The network interface 206 is connected to the network 1000 through which input and output of information are performed. A MODEM (modem) 209 is connected to a public line through which input and output of information are performed. An SRAM 213 is a non-volatile storage medium that can operate at high speed. An RTC 214 is a real time clock that continuously counts the current time even when the control unit 200 is off. In this embodiment, the RTC is used when storing the time regarding a job log, an operation log, and the like (described later) in a storage device. These devices are arranged on a system bus 215.

An Image Bus I/F 216 is a bus bridge that connects the system bus 215 and an image bus 217 that transfers image data at high speed, and converts the data structure. The image bus 217 is configured by a PCI bus or an IEEE1394. Devices arranged on the image bus 217 are as follows. A RIP unit 218 is a raster image processor that expands PDL data into a bitmap image. A device I/F 219 connects the scanner 208 and the printer 207 to the control unit 200, and synchronously or asynchronously converts image data. A scanner image processing unit 220 corrects, processes, and edits image data that has been input. A printer image processing unit 221 performs, for example, printer correction, resolution conversion, and the like on image data that is to be output by printing. An encryption processing unit 222 performs encryption processing on data including image data that has been input. A decryption processing unit 223 performs decryption processing on encrypted data.

Hardware Configuration of the Information Processing Apparatus

Figure 12:
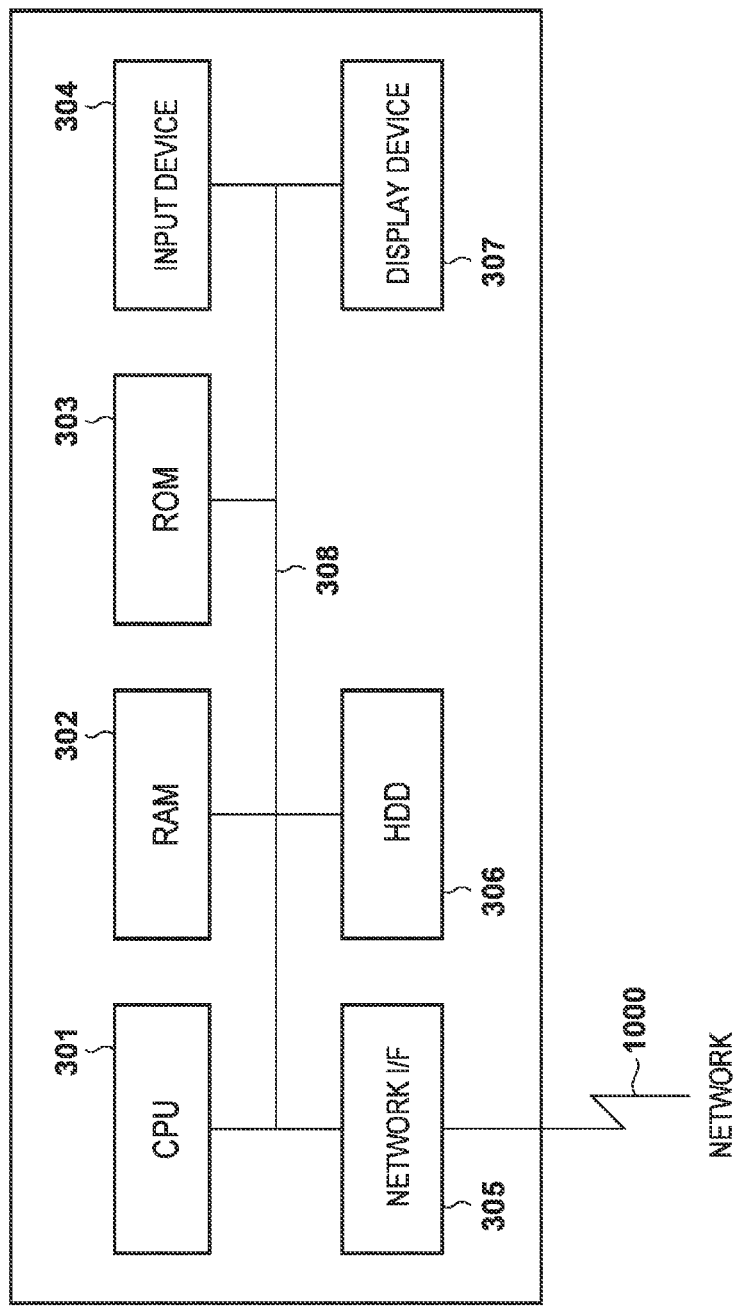
FIG. 12 is a diagram showing an example of the hardware configuration of an information processing apparatus according to this embodiment.

Next, an exemplary hardware configuration of the client PC 1001 will be described with reference to FIG. 12. In FIG. 12, a CPU 301, a RAM 302, a ROM 303, an input device 304, a network I/F 305, a hard disk drive (HDD) 306, and a display device 307 are communicably connected to each other via a system bus 308.

The ROM 303 or the HDD 306 stores a program for controlling an operating system, an application, and the like. The CPU 301 functions as a computer by reading and executing this control program as necessary from the ROM 303 or the HDD 306 into the RAM 302. Furthermore, the CPU 301 communicates with other devices on the network connected via the network I/F 305. The input device 304 is a keyboard, a mouse, or the like, and receives input from a user using this system. The display device 307 is a display screen or the like, and displays an input screen or the like for a user using this system.

Software Configuration

Figure 13:
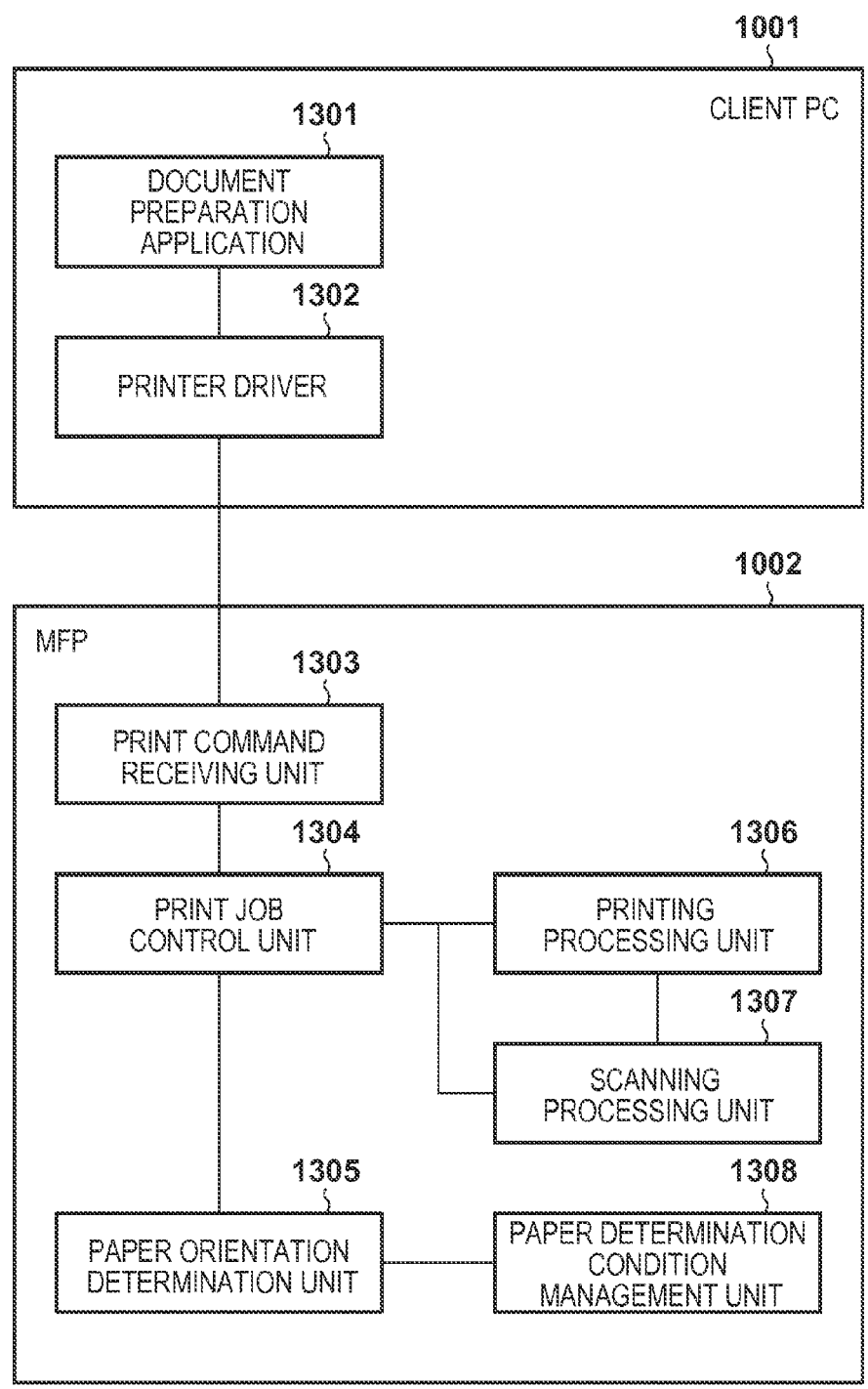
FIG. 13 is a diagram showing an example of the software configuration of the document processing system according to this embodiment.

Next, the software configuration of the system according to this embodiment will be described with reference to FIG. 13. The blocks in FIG. 13 show functions that are realized by executing software (programs) processed by the apparatuses in FIG. 10. Note that the software configuration described below may be realized as hardware or as a combination of hardware and software.

First, the software configuration of the client PC 1001 will be described. The client PC 1001 notifies the MFP 1002, via a printer driver 1302, of an application data print instruction generated by a document preparation application 1301 installed on the client PC 1001. The printer driver 1302 that has received a print instruction from each application (the print instruction from the document preparation application 1301 in this example) converts the instruction into a print command that can be interpreted by the MFP 1002, and transmits it to the MFP 1002. In this example, a case is described in which a print command is acquired from the client PC (external apparatus) 1001, but the present invention is not limited to this, and a print command that has been input via an user operation using the operation unit 210 or the like may be acquired.

Next, the software configuration of the MFP 1002 will be described. The MFP 1002 analyzes a print command that has been received from the client PC 1001, executes the analyzed information as a print job, and prints an image based on the received image data on the original G or the sheet S. Hereinafter, the software configuration of the MFP 1002 will be described following processing at the time of printing.

The print command transmitted from the client PC 1001 is received by a print command receiving unit 1303 of the MFP 1002. The print command receiving unit 1303 passes the received print command to a print job control unit 1304. The print job control unit 1304 that has accepted the print command analyzes the print command, generates a print job that can be interpreted by the software in the MFP, and performs comprehensive control. The print command is configured by page data indicating page contents such as image data, font, vector data and the like, and print setting information such as paper size, printing method (simplex printing or duplex printing), and the like. These aspects will be described later in detail. Hereinafter, a sheet also may be referred to as a paper.

The print job control unit 1304 is realized mainly by the CPU 201 and the CPU 801 executing various programs. The print job control unit 1304 requests a printing processing unit 1306, a scanning processing unit 1307, and a paper orientation determination unit 1305 to perform processing based on the print setting information of the print command, so that the print job is executed. The printing processing unit 1306 is realized mainly by the CPU 201 and the printer image processing unit 221 executing various programs. The printing processing unit 1306 converts the print job accepted from the print job control unit 1304 into image data, and controls the devices shown in FIG. 8 to print the data on a sheet or an original. The scanning processing unit 1307 is realized mainly by the CPU 201 and the scanner image processing unit 220 executing various programs. Upon receiving the request from the print job control unit 1304, the scanning processing unit 1307 controls the devices shown in FIGS. 8 and 9 to scan an original. Then, the generated scan image is returned to the print job control unit 1304.

Upon receiving the request from the print job control unit 1304, the paper orientation determination unit 1305 determines the orientation of a paper (sheet), using the scan image and the print command accepted together with the request, and image data and calculation formulae managed by a paper determination condition management unit 1308 and used for the determination. Furthermore, as necessary, the content of the print command is corrected such that the orientation matches the sheet orientation determined by the paper orientation determination unit 1305. Furthermore, instead of correcting the print command, it is also possible to perform correction such that the orientation of an image at the time of printing after print command analysis and expansion matches the sheet orientation determined by the paper orientation determination unit 1305.

Print Setting Information

Next, an example of print setting information contained in a print command will be described with reference to FIG. 14. As shown in FIG. 14, one set item and one set value form a pair, and a set value is held in association with a set item. Examples of set items include paper size, paper orientation, printing method, binding direction, paper orientation determination, paper orientation determination method, and the like. A character string uniquely indicating a vertical and horizontal size of a paper is held as the paper size. For example, if a postcard is set, a size of height 148 mm and width 100 mm is indicated, and, if an A4 sheet is set, a size of height 297 mm and width 210 mm is indicated.

The paper orientation indicates a portrait or landscape orientation of a paper, and has portrait and landscape as the set values. In the case of portrait, the size is the same as the size of a paper, and, in the case of landscape, the size is obtained by switching the height and width of the size of a paper. The printing method includes simplex and duplex methods as the set values. In the case of simplex printing, data of all pages is printed on front surfaces of papers, and, in the case of duplex printing, data of odd-numbered pages is printed on front surfaces of papers, and data of even-numbered pages is printed on the back surfaces of the papers. The binding direction indicates the orientation of an image that is to be printed on a back surface in duplex printing, and has long-edge binding and short-edge binding as the set values. In the case of long-edge binding, printing is performed such that the upper side of a front surface and the upper side of a back surface form the same side of the papers. In the case of short-edge binding, printing is performed such that the upper side of a front surface and the lower side of a back surface form the same side of the papers.

The paper orientation determination indicates whether or not to scan a paper (sheet) that is to be printed using the image reading unit 100 in the MFP 1002 before printing, determine the top and the bottom of the paper using the scan data, and correct the page data. If ON is set, a scan is performed and the top and the bottom are determined before printing, and, if OFF is set, a scan is not performed and the top and the bottom are not determined before printing. As the paper orientation determination method, determination information is set indicating which determination method is to be used if the paper orientation determination is ON. As the set value, a character string indicating one determination method stored in advance in the MFP 1002 is set. The determination method will be described later in detail with reference to FIG. 15.

Method for Determining Paper Orientation

Next, a list of values and determination methods set as a paper orientation determination method will be described with reference to FIG. 15. The information on this list is managed by the paper determination condition management unit 1308. The paper determination condition management unit 1308 manages the character strings shown in the column of determination object in FIG. 15. Furthermore, this character string is defined in the paper orientation determination method in the print setting information of the print command. Furthermore, as the paper orientation determination method, a plurality of determination methods may be set.

The determination method indicates a determination method of a paper in association with each determination object. For example, in the case of a Japanese postcard, the determination method is to check whether or not there are seven rectangles arranged side by side in the upper right of an image (read image) obtained by a scan performed before printing. In addition to this, there is a determination method to check whether or not the characters (a predetermined character string) "POSTCARD" are present, by performing analysis using an OCR (optical character recognition) on the upper portion of an image obtained by a scan performed before printing. Furthermore, methods other than the above also may be used, such as a method to compare an image held in advance and a similar image and determine whether or not the similarity is a predetermined degree or more. The paper determination condition management unit 1308 manages these determination methods as paper determination pattern data.

The paper determination pattern data indicates processing for determining the determination object. The determination method may be such that processing of the program branches according to the name and processing corresponding to the name is provided in hard coding, or such that the processing is expressed by an individual determination formula and the determination logic is customized with a program for analyzing the determination formula. Furthermore, a plug-in structure is also possible in which a determination method can be additionally installed from an external terminal that is connected later to the network.

Printing Processing

Next, a processing procedure will be described with reference to FIG. 16, in which the MFP 1002 receives a print command from the client PC 1001 and performs printing processing. The processing described below is realized by the CPU 201 reading and executing a control program stored in the ROM 203 or the HDD 205 into the RAM 202.

First, in S1601, the print command receiving unit 1303 receives a print command from the outside. For example, it is detected that a print command from an external apparatus such as the client PC 1001 connected via the network 1000 has been received. Next, in S1602, the print job control unit 1304 accepts the received print command from the print command receiving unit 1303, and analyzes the print command. The print job control unit 1304 analyzes the print command, thereby determining the orientation (upward, downward, rightward, or leftward) of an image that is to be printed based on the print command.

Next, in S1603, the print job control unit 1304 determines whether or not the set item "paper orientation determination" in print setting information contained in the print command is present. If the paper orientation determination is present, the print job control unit 1304 checks the set value. If the set value is ON, the procedure advances to S1604 where the paper orientation determination unit 1305 performs the paper orientation determination processing, after which the procedure advances to S1605. The paper orientation determination processing will be described later in detail with reference to FIG. 17. In this embodiment, the set item regarding whether or not to perform the determination is independently provided, but this may be realized as a condition that the determination is performed in the case where the paper size is a given set value (e.g., postcard), for example. On the other hand, if the paper orientation determination has not been set or is OFF in S1603, the procedure directly advances to S1605. In S1605, the print job control unit 1304 converts the print command into a print job, and passes the print job to the printing processing unit 1306, thereby causing said unit to perform the printing processing.

Paper Orientation Determination Processing

Figure 17:
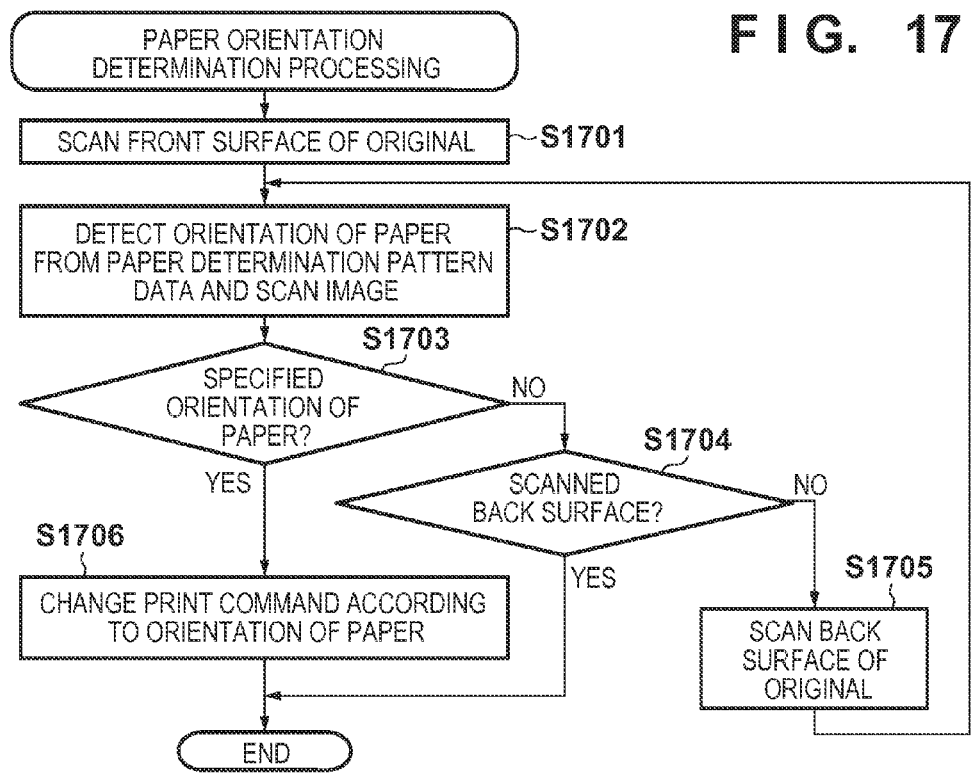
FIG. 17 is a flowchart showing processing in which the MFP determines a paper orientation according to this embodiment.

Next, the paper orientation determination processing in S1604 will be described in detail with reference to FIG. 17. The processing described below is realized by the CPU 201 reading and executing a control program stored in the ROM 203 or the HDD 205 into the RAM 202.

Figure 18:
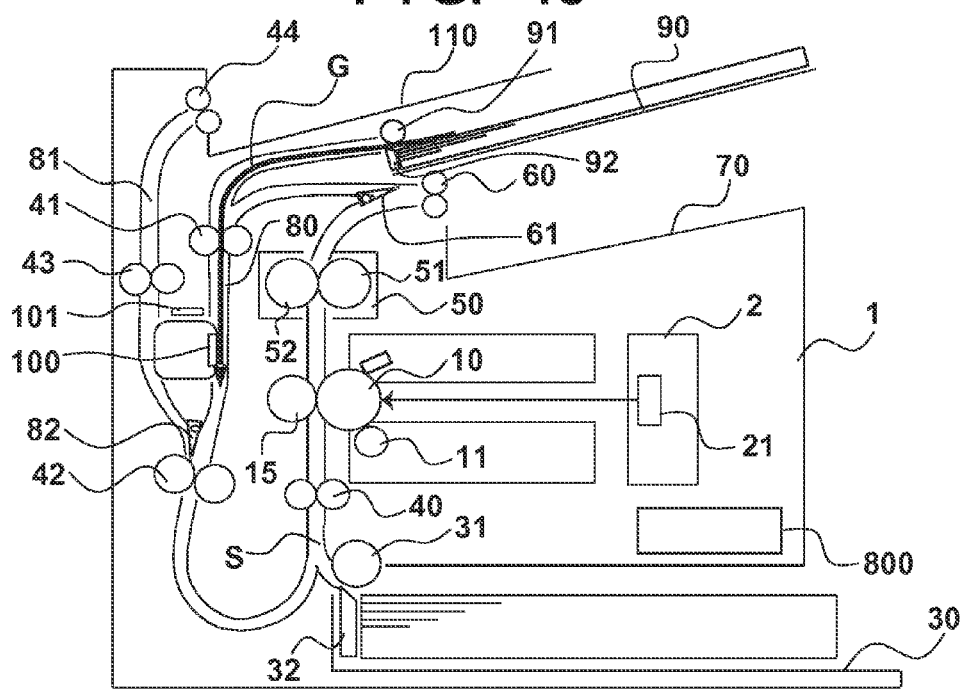
FIG. 18 is an explanatory view at the time of start of reading in order to determine the orientation of an original according to this embodiment.

First, in S1701, the print job control unit 1304 that has accepted the print command gives a scan instruction to the scanning processing unit 1307, thereby causing said unit to scan a front surface of a paper that is to be printed. At that time, if a paper is placed on the second paper feeding unit 90, the paper on the second paper feeding unit 90 is fed and its front surface is scanned. Specifically, as shown in FIG. 18, the print job control unit 1304 feeds a paper placed on the second paper feeding unit 90, and causes the image reading unit 100 to read a first surface (front surface) of the original that has been fed. On the other hand, if no paper is placed on the second paper feeding unit 90, a paper is fed from the first paper feeding unit 30, and its front surface is scanned. In that case, the print job control unit 1304 feeds a paper that has been set in the first paper feeding unit 30 with its surface having an image being oriented downward in FIG. 18, and causes the image reading unit 100 to read the paper while the paper is being conveyed on the duplex conveying path 80. Note that, at that time, the heat roller 51 and the pressure roller 52 of the fixing unit 50 are preferably spaced away from each other by a spacer mechanism (not shown) such that too much heat is not applied to the paper.

Next, in S1702, the print job control unit 1304 passes the scan image and the print command to the paper orientation determination unit 1305, so that the orientation of the paper is detected using a determination method whose determination object is the same as the set value of the paper orientation determination method in the print setting information of the print command. That is to say, if the set value is "postcard", for example, it is determined whether or not there are seven rectangles arranged side by side in the upper right in a paper scan image read by the scanning processing unit 1307. Note that the upper right refers to an upper right region obtained by dividing a scan image into four regions by evenly dividing the image in the vertical and horizontal directions. If there are seven rectangles arranged side by side in the upper right without rotation of the image, the print job control unit 1304 determines from the scan image that the paper is oriented upward. For example, if it is determined from the scan image that the paper is oriented sideways, the scan image is rotated clockwise by 90 degrees, and it is determined whether or not there are seven rectangles arranged side by side in the upper right of the scan image that has been rotated. If there are seven rectangles arranged side by side in the upper right, the print job control unit 1304 determines from the scan image that the paper is oriented leftward. On the other hand, if there are not seven rectangles arranged side by side in the upper right, the print job control unit 1304 rotates the original scan image counterclockwise by 90 degrees, and it is determined whether or not there are seven rectangles arranged side by side in the upper right of the scan image that has been rotated. If there are seven rectangles arranged side by side in the upper right, the print job control unit 1304 determines from the scan image that the paper is oriented rightward. On the other hand, if there are not seven rectangles arranged side by side in the upper right, the paper may be oriented downward, and, thus, the print job control unit 1304 rotates the original scan image by 180 degrees, and it is determined whether or not there are seven rectangles arranged side by side in the upper right of the scan image that has been rotated. If there are seven rectangles arranged side by side in the upper right, the print job control unit 1304 determines from the scan image that the paper is oriented downward. In this manner, it is determined whether the paper that is being conveyed is oriented upward, downward, rightward, or leftward, for example, depending on when seven rectangles become arranged side by side in the upper right while rotating the scan image. If, without rotating the image, it is possible to detect the target corresponding to each case where the paper is oriented sideways or upside down, the scan image does not have to be rotated, and the print job control unit 1304 may detect the orientation of the paper by detecting which region of the scanner image includes the target. For example, if there are seven rectangles arranged side by side in the upper right, it may be determined that the paper is oriented upward, and if there are seven rectangles arranged side by side in the upper left, it may be determined that the paper is oriented leftward. Furthermore, if there are seven rectangles arranged side by side in the lower right, it may be determined that the paper is oriented rightward, and, if there are seven rectangles arranged side by side in the lower left, it may be determined that the paper is oriented downward.

Next, in S1703, the print job control unit 1304 acquires the detection result of the paper orientation from the paper orientation determination unit 1305, and determines whether or not the paper orientation has been specified. If the paper orientation has not been specified, the procedure advances to S1704, and, if the paper orientation has been specified, the procedure advances to S1706. If the paper orientation has not been specified, the surface that has been scanned up until then may be a back surface (on which there are not seven rectangles) of the postcard, and, thus, in S1704, the print job control unit 1304 determines whether or not the back surface (second surface) of the paper has been scanned. If the back surface (second surface) of the paper has not been scanned, the procedure advances to S1705 where the print job control unit 1304 gives the scanning processing unit 1307 an instruction to scan the back surface (second surface) of the paper. The scanning processing unit 1307 that has accepted the scan instruction controls the conveying rollers, scans the back surface (second surface) of the paper, and passes the scan image to the print job control unit 1304. The back surface of the paper is scanned following the procedure as sequentially illustrated in FIGS. 3 to 5, after which the procedure advances to S1702 where the print job control unit 1304 again performs the paper orientation detection processing on the scan image of the back surface (second surface) of the paper. If the paper orientation cannot be specified on the back surface (second surface) of the paper, that is, if it is determined in S1704 that the back surface (second surface) has been scanned, the paper orientation determination processing ends without any further processing. Note that, in order to perform the scanning processing on the back surface, the scanning processing unit 1307 conveys the sheet S as described with reference to FIGS. 4 and 5.

On the other hand, if the paper orientation has been specified in the paper orientation detection processing on the front surface or the back surface of the paper, the procedure advances to S1706 where the print job control unit 1304 changes as necessary the print command according to the specified orientation. In this processing, the print command is changed such that the paper orientation (upward, downward, leftward, or rightward) matches the print request of the print command as appropriate. For example, if it is detected that the front surface is oriented upward, this processing ends without particularly changing the print command. If it is detected that the front surface is oriented downward (i.e., the paper is upside down), the entire page data is rotated by 180 degrees. In a similar manner, if the front surface is oriented leftward (the upper edge is positioned on the left side), the entire page data is rotated by −90 degrees, and, if the front surface is oriented rightward (the upper edge is positioned on the right side), the entire page data is rotated by 90 degrees. With this processing, adjustment is performed such that the paper orientation matches the orientation of image data that is to be printed. Then, as described with reference to FIG. 16, in S1605, the printing processing unit 1306 performs the printing processing using the changed print command.

If the print command is for a plurality of pages of paper, basically, the paper orientation is determined for each page and the printing is performed. When performing printing on the second page, the paper orientation is determined again and the printing is performed. However, control is also possible in which the paper orientation of only the first page of paper is determined, and the processing is performing on the following pages assuming that they are in the same orientation as the first page. In this case, the time for the determination can be reduced.

In this embodiment, an example has been described in which the received print command is changed according to the determination result of the paper orientation. However, the present invention is not limited to this control, and control is also possible in which the image data obtained after print command analysis and expansion is processed, so that the orientation of an image at the time of printing is changed. This control can be realized, for example, by changing the output order of a print signal that is to be output to the optical unit 2.

Figure 16:
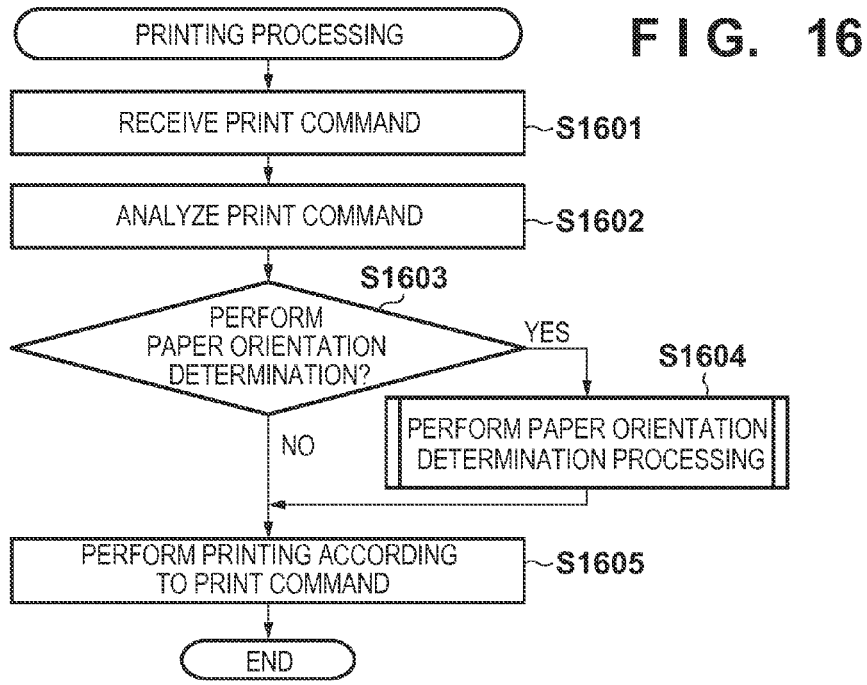
FIG. 16 is a flowchart showing processing in which the MFP receives a print command from a client PC and performs printing according to this embodiment.

Furthermore, if the paper orientation has not been detected on either the front surface or the back surface, the printing is performed without any particular image correction according to the flowchart in FIG. 16, but the printing may be stopped, and an error message may be displayed. In the processing that changes the print command in S1706, it is also possible to perform additional processing such as positional correction further using the scan image and the page data. For example, when performing printing on a postcard, it is possible to displace the numbers of a zip code so as to be accommodated inside the respective rectangles, or to reduce the font size when the size is too large. Furthermore, when using an already printed paper, it is possible to detect a blank portion of the paper and perform processing such as positional correction, size enlargement or reduction, and the like such that the page data is located in said portion. That is to say, when it is determined that an image is already present, correction may be performed such that an image that is to be printed does not overlap said image.

In the foregoing embodiment, an example has been described in which processing such as correction of page data is performed inside the MFP 1002. However, the present invention may be embodied such that an RPC (remote procedure call) (SOAP, REST, etc.) is used to give a processing request to the client PC 1001, a server on the network 1000, or the like. For example, a method may be employed in which the MFP 1002 scans both surfaces of a paper, transmits the scan images of the two surfaces and the print setting information using an RPC to a terminal that performs the paper orientation determination processing, receives the corrected images, and performs the printing processing using the images.

As described above, the printing apparatus according to the present invention detects the orientation (e.g., upward, downward, leftward, or rightward, and front or back) of a sheet that is to be printed, and determines whether or not the detected orientation of the sheet matches the orientation of an image that is to be printed based on the print command. If the orientations do not match each other, the printing apparatus corrects the print command or the image, so that the image orientation matches the sheet orientation. Accordingly, this printing apparatus can prevent printing on a sheet to be performed in an orientation not intended by a user when the user places the sheet in a wrong orientation on a paper feed cassette or a manual feed tray. Accordingly, useless printing can be prevented, and ink and sheets are prevented from being wasted.

Other Embodiments

In the foregoing embodiments, for the sake of convenience of this description, the MFP 1002 has been described that performs printing using one photosensitive drum, but the present invention can be applied also to an MFP that performs printing using photosensitive drums respectively corresponding to four colors of C, M, Y, and K. Furthermore, although a case has been described in which an image obtained by analyzing a print command that has been received from a host computer is printed on a paper, this processing may be performed on an image that has been read by the scanner 208 and stored in advance in the HDD 205.

Figure 19:
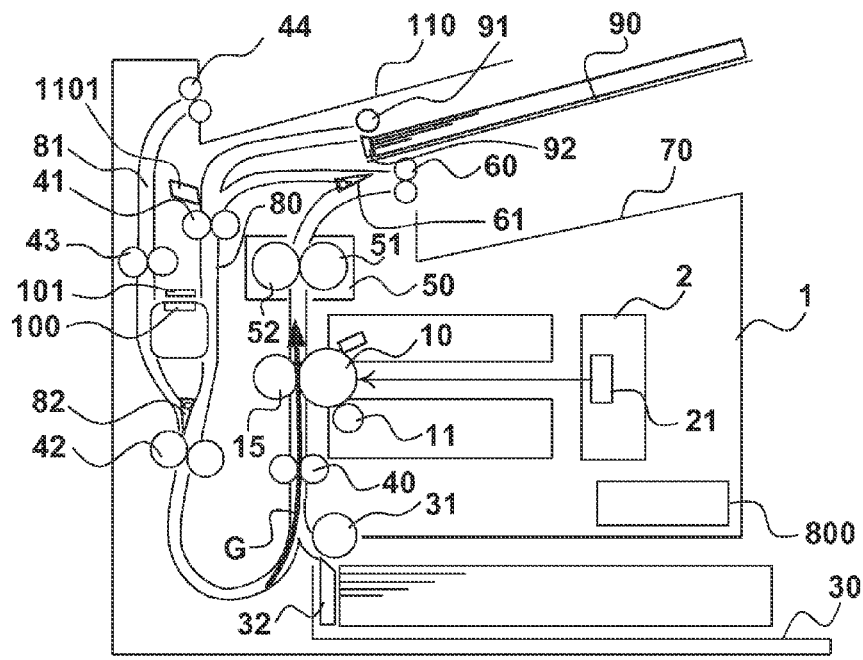
FIG. 19 is an explanatory view illustrating printing of an image with respect to an original according to this embodiment.

Furthermore, after an image is printed on a paper through the processing described with reference to FIGS. 18 and 19, the CPU 201 may perform control such that the image printed on the paper is read by the image reading unit 100, and the reading result is displayed on the operation unit 210.

Specifically, after an image is printed on a paper through the processing described with reference to FIGS. 18 and 19, the CPU 201 conveys the paper to the paper discharge rollers 60. Then, the paper discharge rollers 60 are rotated clockwise in FIG. 19, and the paper is conveyed until its trailing edge reaches the paper discharge rollers 60. When the trailing edge of the paper becomes held between the paper discharge rollers 60, the CPU 201 lowers the flapper 61, and rotates the paper discharge rollers 60 in reverse. Then, the CPU 201 conveys the original on the duplex conveying path 80 as shown in FIG. 2 to the paper position shown in FIG. 4. Subsequently, the CPU 201 rotates the image reading unit 100 toward the original-dedicated conveying path 81 and rotates the conveying rollers 42 in reverse, thereby conveying the original as shown in FIG. 5. In this example, the CPU 201 causes the image reading unit 100 to read the image (image printed by the printing unit) of the original that is being conveyed on the original-dedicated conveying path 81, stores the read image in the HDD 205, and displays the image stored in the HDD 205 on the operation unit 210. This operation is repeated each time an image is printed on a paper, and, thus, the user can easily check with the image displayed on the operation unit 210 whether or not the printed image is as intended, without picking up and checking a printed sheet each time a printed sheet is discharged. Note that the read image may be displayed on the PC 1001 that is communicable via the network 1000.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from recording media of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-106313 filed on May 7, 2012, which is hereby incorporated by reference herein in its entirety.

What is claimed is:

1. An image forming apparatus, comprising:
   a first conveying unit configured to convey a sheet from a sheet feeding unit to a reading position disposed along a duplex conveying path;
   a reading unit configured to read the sheet which is conveyed to the reading position by the first conveying unit;
   a second conveying unit configured to convey the sheet read by the reading unit so as to be discharged via an original-dedicated conveying path in a case where an image is not printed onto the sheet conveyed by the first conveying unit, and to convey the sheet read by the reading unit to a printing position in a case where an image is printed onto the sheet conveyed by the first conveying unit;

a printing unit configured to print an image onto the sheet which is conveyed to the printing position by the second conveying unit;

a detecting unit configured to detect an orientation of the sheet read by the reading unit; and a deciding unit configured to decide an orientation of the image to be printed onto the conveyed sheet, according to an orientation detected by the detecting unit;

wherein the printing unit prints the image onto the sheet which is read by the reading unit and is conveyed to the printing position by the second conveying unit, in an orientation decided by the deciding unit, and wherein the duplex conveying path and the original-dedicated conveying path converge at the second conveying unit.

2. The image forming apparatus according to claim 1, wherein the detecting unit detects an orientation of the sheet read by the reading unit according to detection information indicating a detection method for detecting an orientation of the sheet read by the reading unit.

3. The image forming apparatus according to claim 2, wherein the detection method includes at least one of a method that determines whether or not there are seven rectangles arranged side by side in the upper right of the sheet read by the reading unit, a method that determines whether or not a predetermined character string is contained in the sheet read by the reading unit, and a method that determines whether or not an image similar to an image that is held in advance is present on the sheet read by the reading unit.

4. The image forming apparatus according to claim 1, wherein the reading unit is a scanner.

5. The image forming apparatus according to claim 1, further comprising:

a receiving unit configured to receive a print command for generating the image that is to be printed on the sheet read by the reading unit; and a correction unit configured to correct the print command received by the receiving unit such that the image is formed in an orientation decided by the deciding unit.

6. The image forming apparatus according to claim 1, further comprising a determination unit configured to determine whether or not to perform a detection by the detecting unit, wherein the detecting unit is configured to detect an orientation of the sheet read by the reading unit in a case where it is determined to perform the detection.

7. A method for controlling an image forming apparatus, comprising:

conveying a sheet from a sheet feeding unit to a reading position disposed along a duplex conveying path;

reading the sheet which is conveyed to the reading position;

conveying the read sheet so as to be discharged via an original-dedicated conveying path in a case where an image is not printed onto the conveyed sheet, and conveying the read sheet to a printing position in a case where an image is printed onto the conveyed sheet;

printing an image onto the sheet which is conveyed to the printing position;

detecting an orientation of the read sheet; and deciding an orientation of the image to be printed onto the conveyed sheet, according to a detected orientation;

wherein the image is printed onto the sheet which is read by the reading unit and is conveyed to the printing position in a decided orientation, and wherein the duplex conveying path and the original-dedicated conveying path converge at the second conveying unit.

8. A non-transitory computer-readable storage medium storing a computer program for causing a computer to execute the method for controlling an image forming apparatus according to claim 7.

* * * * *